United States Patent
Canitz

(10) Patent No.: US 10,268,446 B2
(45) Date of Patent: Apr. 23, 2019

(54) NARRATION OF UNFOCUSED USER INTERFACE CONTROLS USING DATA RETRIEVAL EVENT

(71) Applicant: Microsoft Technology Licensing, LLC, Redmond, WA (US)

(72) Inventor: James Andrew Canitz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/769,825

(22) Filed: Feb. 19, 2013

(65) Prior Publication Data

US 2014/0237369 A1    Aug. 21, 2014

(51) Int. Cl.
*G06F 3/00*     (2006.01)
*G06F 3/16*     (2006.01)
*G06F 3/0481*   (2013.01)

(52) U.S. Cl.
CPC ............ *G06F 3/167* (2013.01); *G06F 3/0481* (2013.01)

(58) Field of Classification Search
CPC ..... G06F 3/048; G06F 17/30; G06F 17/30011
See application file for complete search history.

(56) References Cited

U.S. PATENT DOCUMENTS

| | | | |
|---|---|---|---|
| 6,405,364 B1 | 6/2002 | Bowman-Amuah | |
| 7,490,313 B2 | 2/2009 | Sinclair et al. | |
| 7,554,522 B2 | 6/2009 | Sinclair, II et al. | |
| 7,721,254 B2 | 5/2010 | Relyea et al. | |
| 7,827,527 B1 | 11/2010 | Chiluvuri | |
| 7,831,905 B1* | 11/2010 | Jennings et al. | 715/236 |
| 7,945,531 B2 | 5/2011 | Mullender et al. | |
| 8,095,911 B2 | 1/2012 | Ronen et al. | |
| 8,146,109 B2 | 3/2012 | Shneerson et al. | |
| 8,261,231 B1 | 9/2012 | Hirsch et al. | |
| 8,336,043 B2 | 12/2012 | Lavery et al. | |
| 8,548,618 B1* | 10/2013 | Story et al. | 700/94 |
| 9,817,632 B2* | 11/2017 | Canitz | G06F 3/167 |
| 2004/0070612 A1 | 4/2004 | Sinclair et al. | |
| 2006/0139312 A1 | 6/2006 | Sinclair, II et al. | |
| 2007/0047701 A1* | 3/2007 | Morris | G06Q 10/10 379/100.08 |
| 2007/0218912 A1* | 9/2007 | Song et al. | 455/445 |
| 2008/0170118 A1* | 7/2008 | Albertson | A61H 3/061 348/46 |

(Continued)

OTHER PUBLICATIONS

Rosalind Rogoff; Voice activated GUI—the next user interface; 2011; IEEE; 4 pages.*

(Continued)

*Primary Examiner* — Linh K Pham
(74) *Attorney, Agent, or Firm* — Arent Fox LLP

(57) ABSTRACT

In one embodiment, a user interface narrator may repurpose a data retrieval event 232 to narrate user interface items 304 not under input control focus 306. The user interface narrator may use a narration control 212 of an operating system 210 to vocalize a user interface 222. The user interface narrator may execute an application task outside of an input control focus 306. The user interface narrator may receive a repurposed data retrieval event 232 for an application binary interface 230 of the operating system 210 to alert a narration control 212 of a task event for the application task.

20 Claims, 9 Drawing Sheets

(56) References Cited

U.S. PATENT DOCUMENTS

| | | | | |
|---|---|---|---|---|
| 2008/0212145 | A1* | 9/2008 | Kim | H04N 1/00405 358/434 |
| 2008/0262846 | A1* | 10/2008 | Burns | G10L 13/08 704/260 |
| 2009/0113306 | A1* | 4/2009 | Fujishita | G09B 21/001 715/729 |
| 2009/0313014 | A1* | 12/2009 | Shin | 704/235 |
| 2010/0162260 | A1* | 6/2010 | Ibrahim | G06F 9/505 718/105 |
| 2010/0205551 | A1* | 8/2010 | Underwood et al. | 715/760 |
| 2011/0154212 | A1* | 6/2011 | Gharpure | G06F 17/30867 715/738 |
| 2012/0116778 | A1* | 5/2012 | Fleizach | G10L 13/0335 704/271 |
| 2013/0066637 | A1* | 3/2013 | Seto | G06F 3/167 704/275 |
| 2013/0144625 | A1* | 6/2013 | Kurzweil et al. | 704/260 |
| 2013/0150017 | A1* | 6/2013 | Gold | H04W 88/02 455/419 |
| 2013/0179173 | A1* | 7/2013 | Lee | G10L 15/22 704/275 |
| 2013/0208135 | A1* | 8/2013 | Han | G06F 3/017 348/211.9 |
| 2013/0215041 | A1* | 8/2013 | Kim | G06F 3/0487 345/173 |
| 2013/0226590 | A1* | 8/2013 | Lee | G06F 3/167 704/275 |
| 2013/0238326 | A1* | 9/2013 | Kim | G06F 3/167 704/231 |
| 2013/0290856 | A1* | 10/2013 | Beveridge | G06F 9/4445 715/740 |
| 2014/0095173 | A1* | 4/2014 | Lynch | G10L 15/22 704/275 |

OTHER PUBLICATIONS

Chieko Asakawa; User interface of a document-processing reader for the blind; 2002. IEEE; 4 pages.*

Michail et al.; Adaptive Browsing Shortcuts: Personalising the User Interface of a Specialised Voice Web Browser for Blind People; 2007; IEEE; 8 pages.*

Sef et al.; SoundHint system for blind and partially sightless people; 2002; IEEE; 4 pages.*

"Accessibility in Windows 8", Retrieved at <<http://www.microsoft.com/enable/products/windows8/>>,Retrieved Date : Dec. 26, 2012, pp. 7.

"How to Record Screen Video with Byte-scout Screen Capturing Freeware", Retrieved at <<http://bytescout.com/products/enduser/screencapturing/screencapturing_how_to_record_screen_video_tutorial.html>>, Aug. 17, 2010, pp. 4.

"Developer's Guide—Accessibility Support", Retrieved at <<https://developers.google.com/web-toolkit/doc/latest/DevGuideA11y>>, Retrieved Date : Dec. 26, 2012, pp. 8.

Fletcher, Mark., "Screen Recording with Articulate Storyline", Retrieved at <<http://storylineauthors.com/?p=249>>, Apr. 5, 2012, pp. 5.

Horowitz, Paul., "How to use the Screen Recorder on a Mac", Retrieved at <<http://osxdaily.com/2010/11/16/screen-recorder-mac/>, Nov. 16, 2010, pp. 8.

"Screen Readers for Blind Users", Retrieved at <<http://atcoalition.org/article/screen-readers-blind-users>>, Dec. 26, 2012, pp. 2.

Sinofsky, Steven, "Enabling Accessibility", Retrieved at <<http://blogs.msdn.com/b/b8/archive/2012/02/14/enabling-accessibility.aspx>>, Feb. 14, 2012, pp. 24.

"Accessibility", Retrieved at <<http://msdn.microsoft.com/en-us/library/windows/desktop/bb545462.aspx>>, Retrieved Date: Dec. 20, 2012, pp. 14.

Foley, Mary Jo, "More on Microsoft 'Jupiter' and What It Means for Windows 8", Retrieved at <<http://www.zdnet.com/blog/microsoft/more-on-microsoft-jupiter-and-what-it-means-for-windows-8/8373>>, Jan. 6, 2011, pp. 9.

Langtree, Ian, "Apple iPad 2 Accessbility Features Review", Retrieved at <<http://www.disabled-world.com/assistivedevices/computer/ipad-2.php>>, Oct. 22, 2011, pp. 3.

"Flash Professional / Best Practices—Accessibility Guidelines", Retrieved at <<http://help.adobe.com/en_US/flash/cs/using/WSd60f23110762d6b883b18f10cb1fe1af6-7b34a.html>>, Jun. 25, 2010, pp. 4.

Rousset, David "Hands-On Lab: Making Silverlight Applications Accessbile", Retrieved at <<http://blogs.msdn.com/b/davrous/archive/2011/05/26/hands-on-lab-making-silverlight-applications-accessible.aspx>>, May 26, 2011, pp. 7.

Miyashita et al., "Making Multimedia Content Accessible for Screen Reader Users", Retrieved at <<http://www.w4a.info/2007/prog/wa-0-miyashita.pdf>>, In Proceedings of the 2007 International Cross-Disciplinary Conference on Accessbility, May 7-8, 2007, pp. 2.

* cited by examiner

*800*

900

NARRATION OF UNFOCUSED USER INTERFACE CONTROLS USING DATA RETRIEVAL EVENT

BACKGROUND

Generally, a software application being executed by a computer may interact with a user via a graphical user interface. The user may use a touchpad, keyboard, mouse, or other input device to enter commands to be carried out by the software application. The graphical user interface may present links, controls, data, or other interactive options to the user in a visual form such as text or images. A person with impaired vision may then be unable to satisfactorily interact with the software application.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to repurposing a data retrieval event to narrate user interface items not under input control focus. The user interface narrator may use a narration control of an operating system to vocalize a user interface. The user interface narrator may execute an application task outside of an input control focus. The user interface narrator may receive a repurposed data retrieval event for an application binary interface of the operating system to alert a narration control of a task event for the application task.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
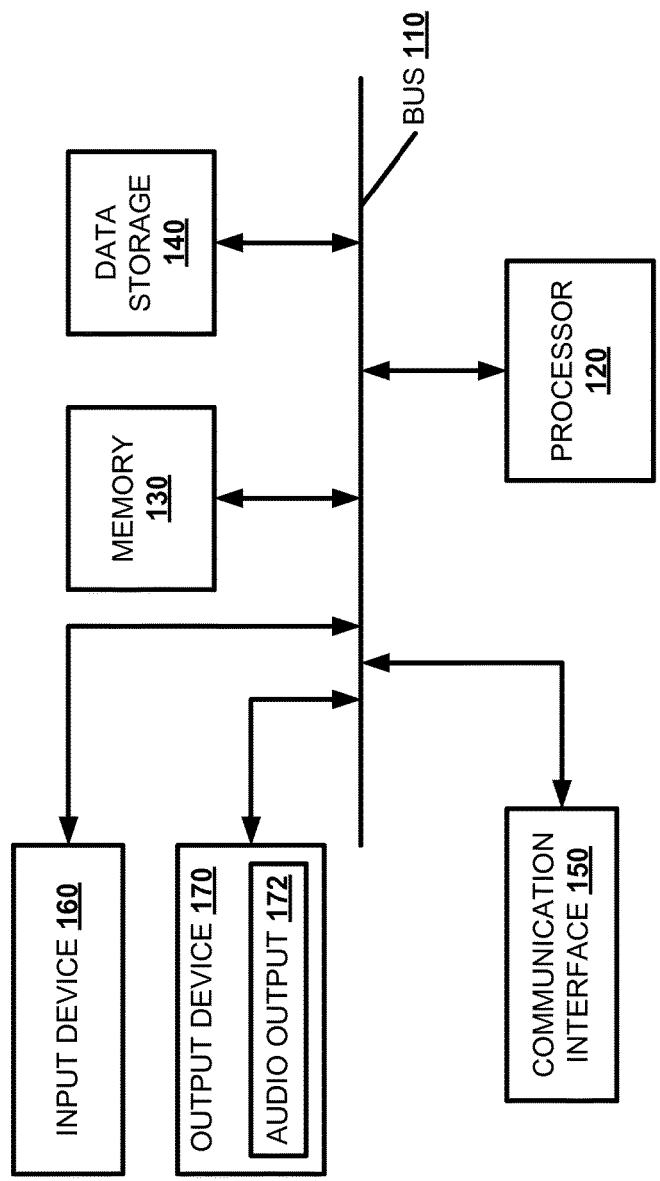
FIG. 1 illustrates, in a block diagram, one embodiment of a computing device.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a user interface narrator for a computing device.

To improve interactions with users, particularly sight-impaired users, a computing device may use a user interface narrator to vocalize user interface items, such as graphics and text. Vocalizing is the creation of audio data to be played to the user representing the user interface items. Rather than have each application module provide narration of the application user interface, an operating system may have a narration control to narrate whichever user interface item has received input control focus, such as a keyboard focus. Input control focus refers to the element of the graphical user interface prepared to receive user selection.

The operating system may provide accessibility information for custom controls for an application module by providing a custom implementation of the application binary interface. A data retrieval event may force a narration control to read a user interface item that does not currently have input control focus. A data retrieval event is a notification that alerts the operating system that a dynamic data retrieval has occurred and content is available. The data retrieval event may be repurposed to cause the narration of an unfocused user interface item.

The application module may pair the data retrieval event with the innate loading mechanics of a custom control to effectively craft an element that announces a task event as soon as the hosting user interface becomes visible. The application module may add this custom control to the root of an alert, error, notification, dialogue box, or logical page user interface and setting the automation properties appropriately in an extensible application markup language data retrieval event. Thus, the application module may get a user interface to automatically narrate when visible, regardless of input control focus.

The data retrieval event may ask the narration control to announce the text value of the text content of the data retrieval event. The application module may apply data binding to the data retrieval event and the text content so that the read text can be dynamically driven by data coming from the application module. The data retrieval event may interact with the narration control to provide the text to narrate.

The application module may set the text narration when the extensible application markup language is loaded. The data retrieval event may trigger the narration control to narrate the content of the data retrieval event upon reception.

Thus, in one embodiment, a user interface narrator may repurpose a data retrieval event to narrate user interface items not under input control focus. The user interface narrator may use a narration control of an operating system to vocalize a user interface. The user interface narrator may execute an application task outside of an input control focus. The user interface narrator may receive a repurposed data retrieval event for an application binary interface of the operating system to alert a narration control of a task event for the application task.

FIG. 1 illustrates a block diagram of an exemplary computing device 100 which may act as a user interface narrator. The computing device 100 may combine one or more of hardware, software, firmware, and system-on-a-chip technology to implement a user interface narrator. The computing device 100 may include a bus 110, a processor 120, a memory 130, a data storage 140, a communication interface 150, an input device 160, and an output device 170. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface for storing an application module.

The communication interface 150 may include any transceiver-like mechanism that enables computing device 100 to communicate with other devices or networks. The communication interface 150 may include a network interface or a transceiver interface. The communication interface 150 may be a wireless, wired, or optical interface.

The input device 160 may include one or more conventional mechanisms that permit a user to input information to the computing device 100, such as a keyboard, a mouse, a voice recognition device, a microphone, a headset, a gesture recognition device, a touch screen, etc. The output device 170 may include one or more conventional mechanisms that output information to the user, including a display, a printer, or a medium, such as a memory, or a magnetic or optical disk and a corresponding disk drive. Specifically, the output device 170 may be an audio output 172, such as a speaker or headset, to convey information to a user in an audio format.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 150.

Figure 2:
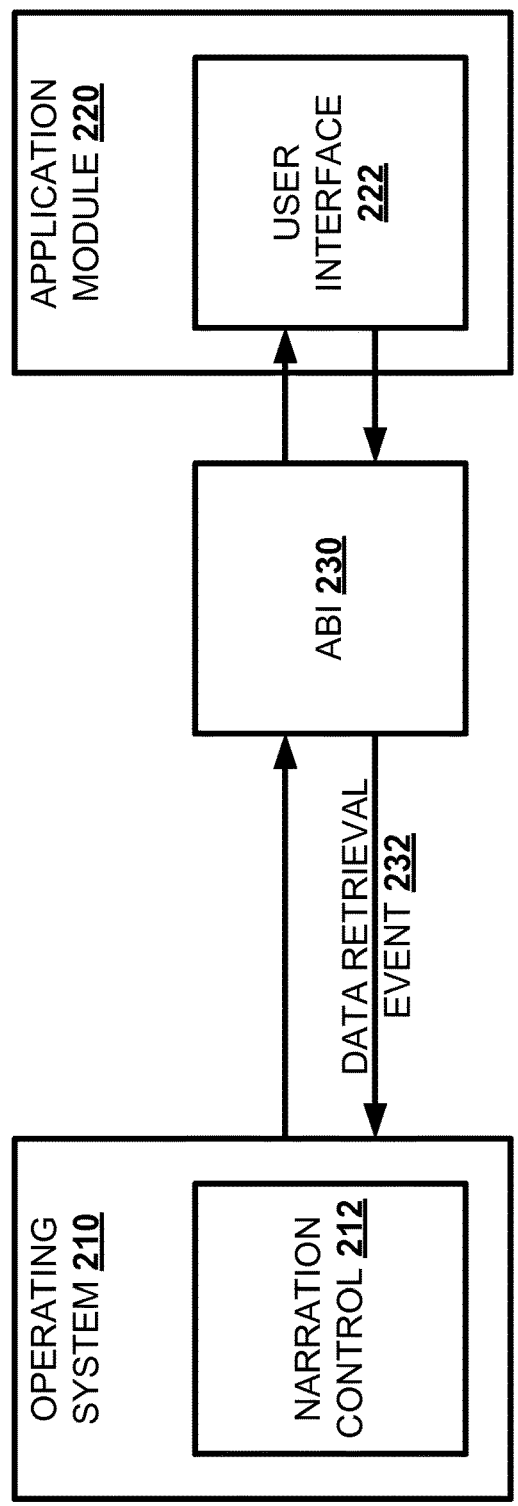
FIG. 2 illustrates, in a block diagram, one embodiment of a software application interaction.

FIG. 2 illustrates, in a block diagram, one embodiment of a software application interaction 200. The computing device 100 may execute an operating system 210. An operating system 210 is a set of software applications that manage the use of hardware resources by an application module 220, as well as interactions between application modules 220. An application module 220 is a software application, or an aspect of a software application. An application module 220 may communicate with the operating system 210 via an application binary interface (ABI) 230. An application binary interface 230 is a tool allowing the application module 220 to access specific tools, functions, and calls provided by the operating system 210. One tool provided by the operating system 210 may be a narration control 212. A narration control 212 converts text from an application module 220 to an audio format to be played for a user. For example, the application module 220 may have a user interface 222 to receive inputs from a user via an input device 160. The narration control 212 may convert text in the user interface 222 to an audio format for presentation to the user.

The application module 220 may execute certain application tasks in background, while other tasks are being executed in the foreground. Foreground tasks are tasks that are selected to receive user input. Background tasks are tasks that are being executed while another task is receiving user input. For example, a background task may be downloading data, such as a media file or an application update. An application module 220 executing a background task may alert the operating system 210 that the background task has been completed by having the application binary interface send the operating system 210 a data retrieval event 232.

Figure 3:
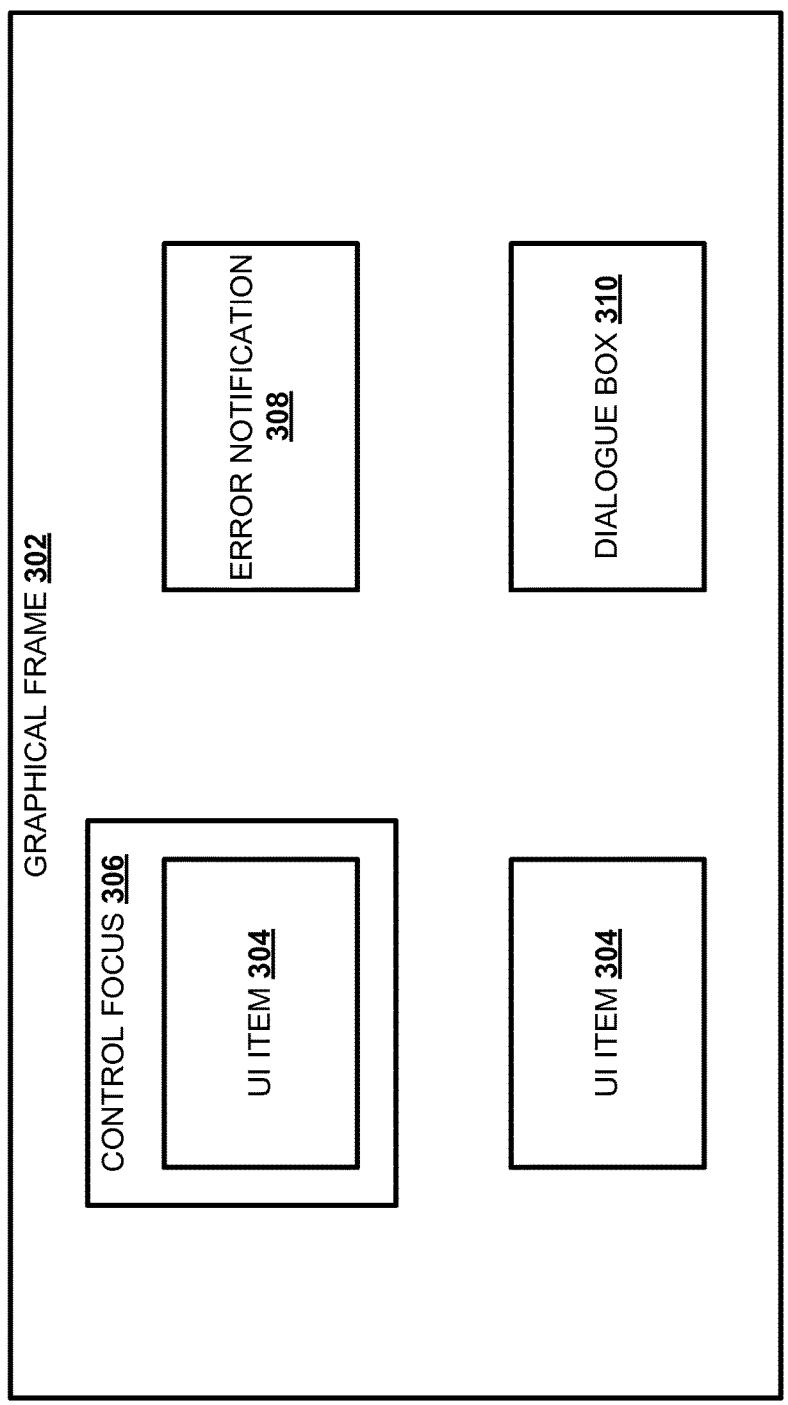
FIG. 3 illustrates, in a block diagram, one embodiment of a graphical user interface.

FIG. 3 illustrates, in a block diagram, one embodiment of a graphical user interface 300. The graphical user interface 300 may present in a graphical frame 302 one or more user interface items 304. A user interface item 304 may be a control or data shown in the graphical frame 302. A user may use the input device 160 to place a user interface item 304 under input control focus 306.

Specifically, if a keyboard is the input device 160 used to apply input control focus 306, the input control focus 306 may be referred to as keyboard focus. The user may use a tab button to move keyboard focus between user interface items 304. Other input devices besides a keyboard may be used to direct input control focus 306. A narration control 212 may vocalize the user interface item 304 under input control focus 306.

An application module 220 may repurpose a data retrieval event 232 away from strictly alerting the operating system to completion of downloads to alert the narration control 212 that a task event has occurred in a background task. Thus, the narration control 212 may be alerted to vocalize an event in a user interface item 304 that is not under input focus control 306. For example, an application module 220 may use a repurposed data retrieval event 232 to alert the narration control to an error notification 308, such as a loss of network service. In another example, an application module 220 may use a repurposed data retrieval event 232 to describe a dialogue box 310 to a user.

Figure 4:
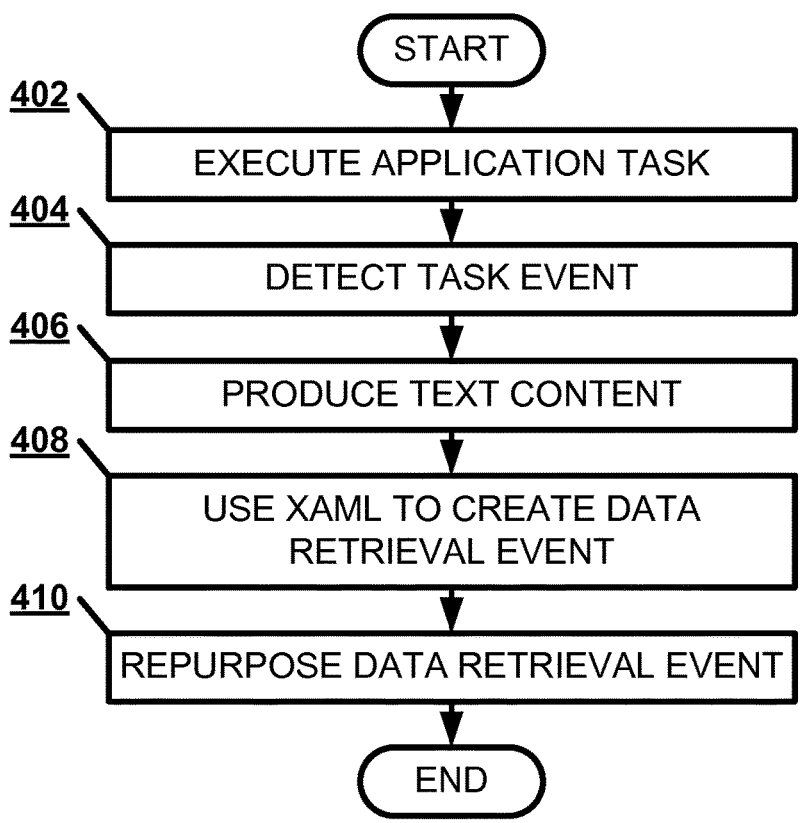
FIG. 4 illustrates, in a flowchart, one embodiment of a method for presenting a task event to a narration control.

FIG. 4 illustrates, in a flowchart, one embodiment of a method for presenting a task event to a narration control 212. The application module 220 may execute an application task outside of an input control focus 306 (Block 402). The application module 220 may detect a task event for the application task, such as an error event or a loss of service (Block 404). The application module 220 may produce text content for the data retrieval event (Block 406). The application module 220 may use extensible application markup language (XAML) to create the data retrieval event 232 (Block 408). The application module 220 may repurpose the data retrieval event 232 for an application binary interface 230 of the operating system 210 to alert a narration control 212 of a task event for the application task (Block 410).

Figure 5:
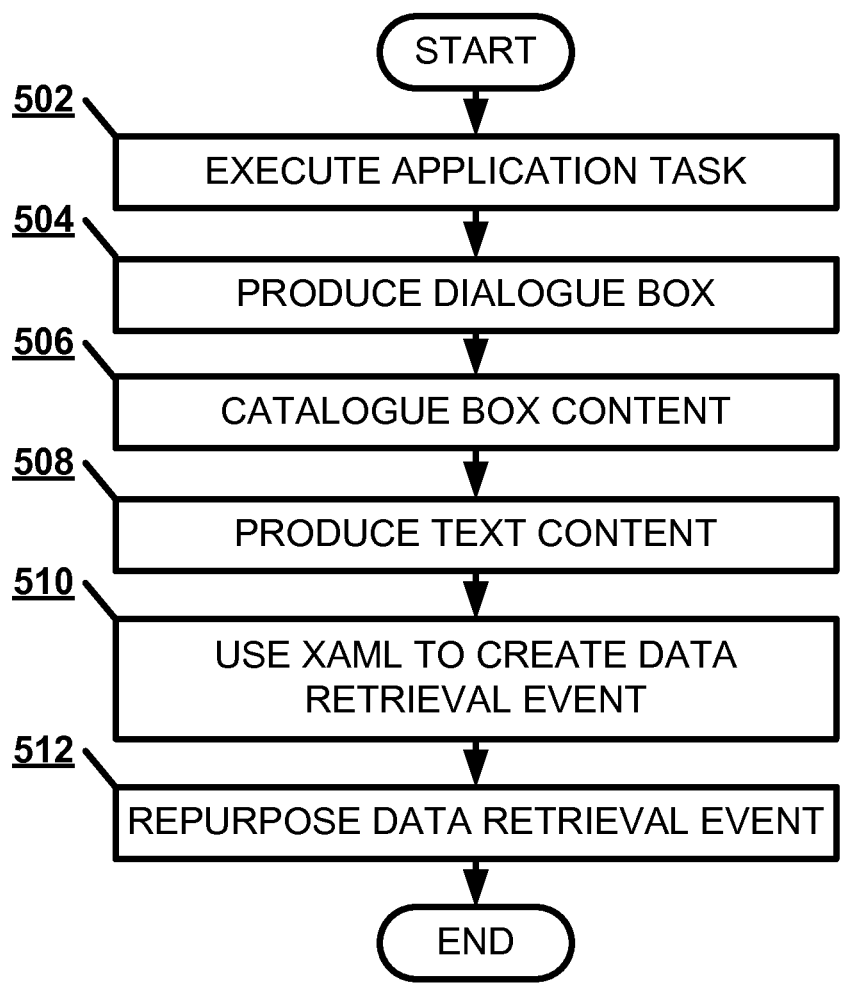
FIG. 5 illustrates, in a flowchart, one embodiment of a method for presenting a dialogue box to a narration control.

FIG. 5 illustrates, in a flowchart, one embodiment of a method for presenting a dialogue box 310 to a narration control 212. The application module 220 may execute an application task outside of an input control focus 306 (Block 502). The application module 220 may produce a dialogue box 310 for a user (Block 504). The application module 220 may catalogue a box content of the dialogue box 310 (Block 506). Box content is text or other data present in a dialogue box 310. The application module 220 may produce text content for the data retrieval event (Block 508). The application module 220 may use extensible application markup language to create the data retrieval event 232 (Block 510). The application module 220 may repurpose the data retrieval event 232 for an application binary interface 230 of the operating system 210 to alert a narration control 212 of the dialogue box (Block 512).

Figure 6:
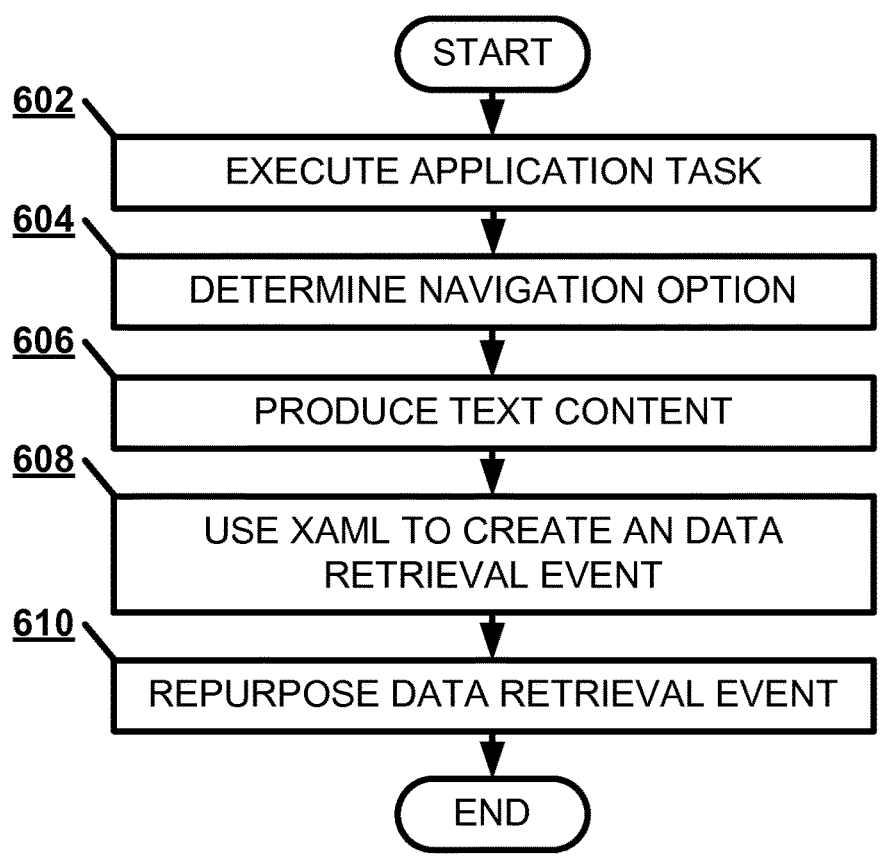
FIG. 6 illustrates, in a flowchart, one embodiment of a method for presenting a virtual navigation option to a narration control.

FIG. 6 illustrates, in a flowchart, one embodiment of a method for presenting a virtual navigation option to a narration control 212. The application module 220 may execute an application task outside of an input control focus 306 (Block 602). The application module 220 may determine a virtual navigation option for a user (Block 604). The application module 220 may produce text content for the data retrieval event (Block 606). The application module 220 may use extensible application markup language to create the data retrieval event 232 (Block 608). The application module 220 may repurpose the data retrieval event 232 for an application binary interface 230 of the operating system 210 to alert a narration control 212 of a task event for the application task (Block 610).

Figure 7:
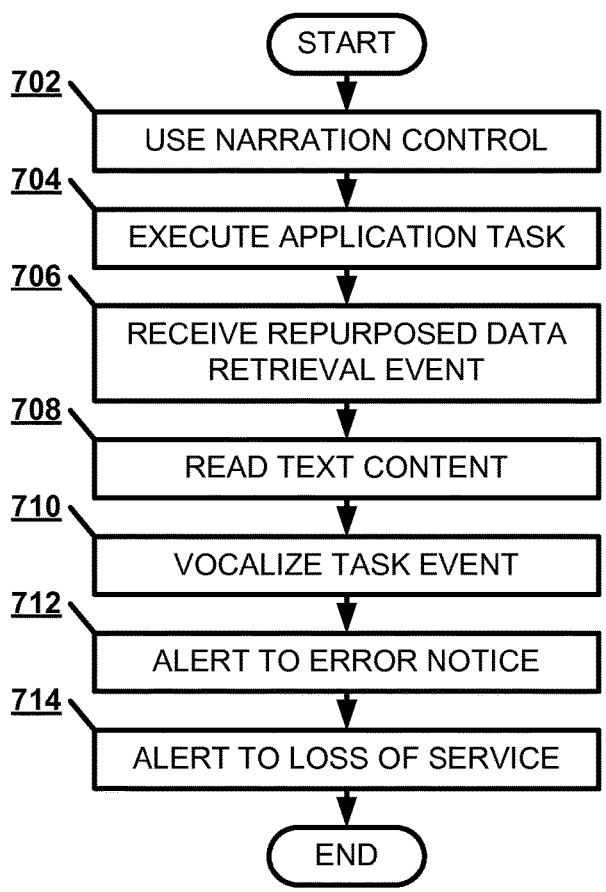
FIG. 7 illustrates, in a flowchart, one embodiment of a method for vocalizing a task event with a narration control.

FIG. 7 illustrates, in a flowchart, one embodiment of a method for vocalizing a task event with a narration control 212. The operating system 210 may use a narration control 212 to vocalize a user interface 222 (Block 702). The operating system 210 may execute an application task outside of an input control focus 306 (Block 704). The operating system 210 may receive a repurposed data retrieval event 232 for an application binary interface 230 of the operating system 210 to alert a narration control 212 of a task event for the application task (Block 706). The operating system 210 may read text content from the repurposed data retrieval event 232 (Block 708). The operating system 210 may vocalize the task event to a user (Block 710). The operating system 210 may alert a user to an error notification 308 (Block 712). The operating system 210 may alert a user to a loss of service to receive a credential reauthorization from the user (Block 714).

Figure 8:
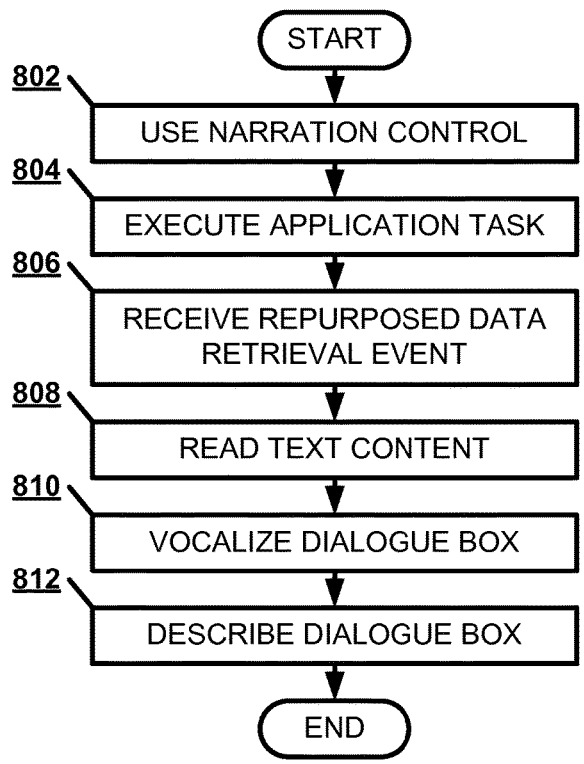
FIG. 8 illustrates, in a flowchart, one embodiment of a method for vocalizing a dialogue box with a narration control.

FIG. 8 illustrates, in a flowchart, one embodiment of a method for vocalizing a dialogue box 310 with a narration control 212. The operating system 210 may use a narration control 212 to vocalize a user interface 222 (Block 802). The operating system 210 may execute an application task outside of an input control focus 306 (Block 804). The operating system 210 may receive a repurposed data retrieval event 232 for an application binary interface 230 of the operating system 210 to alert a narration control 212 of a dialogue box 306 (Block 806). The operating system 210 may read text content from the repurposed data retrieval event 232 (Block 808). The operating system 210 may vocalize the dialogue box 306 to a user (Block 810). The operating system 210 may describe the dialogue box 306 to the user (Block 812).

Figure 9:
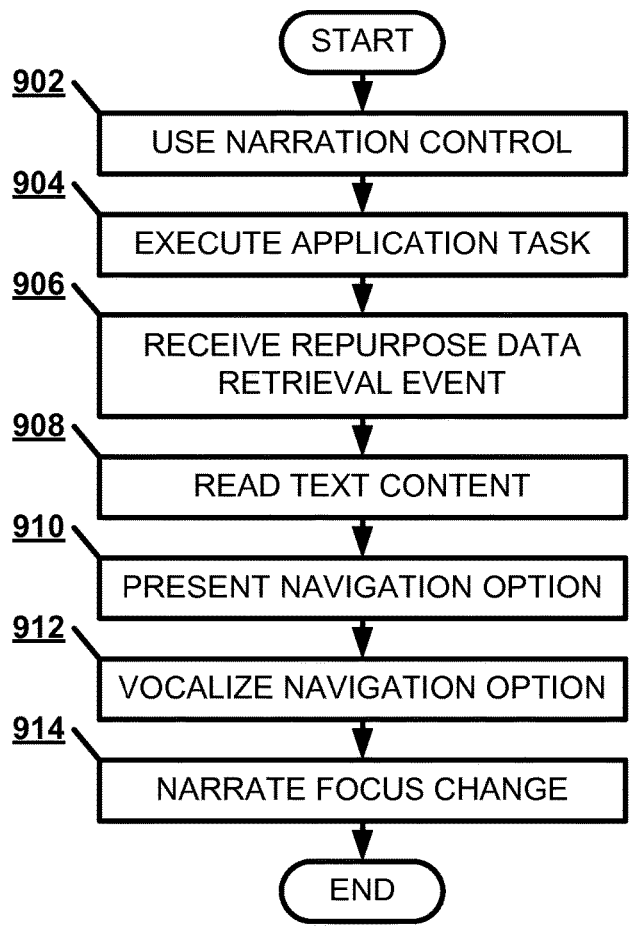
FIG. 9 illustrates, in a flowchart, one embodiment of a method for vocalizing a virtual navigation option with a narration control.

FIG. 9 illustrates, in a flowchart, one embodiment of a method for vocalizing a virtual navigation option with a narration control. The operating system 210 may use a narration control 212 to vocalize a user interface 222 (Block 902). The operating system 210 may execute an application task outside of an input control focus 306 (Block 904). The operating system 210 may receive a repurposed data retrieval event 232 for an application binary interface 230 of the operating system 210 to alert a narration control 212 of a virtual navigation option (Block 906). The operating system 210 may read text content from the repurposed data retrieval event 232 (Block 908). The operating system 210 may present the virtual navigation option to a user (Block 910). The operating system 210 may vocalize the virtual navigation option to a user (Block 912). The operating system 210 may narrate an input control focus change 306, such as a keyboard focus change (Block 914).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A machine-implemented method, comprising:
   vocalizing, by a narration control of an operating system, a user interface item selected as an input control focus by a user, the input control focus corresponding to a displayed element of a graphical user interface prepared to receive one or more user selections, wherein the user interface item corresponds to an application operating in a foreground, and wherein the narration control converts text from an application module to an audio format to be played for the user;
   executing and updating, by the application module while the user interface item operating in the foreground is receiving user input, an application task operating in a background outside of the input control focus without user input, wherein the application task differs from a foreground task associated with the input control focus corresponding to the application operating in the foreground;
   receiving a data retrieval event for an application binary interface of the operating system that alerts the operating system that content associated with the application task operating in the background is available for narration, wherein the data retrieval event is repurposed to cause narration of an unfocused user interface item, the unfocused user interface item corresponding to a second user interface item without the input control focus; and
   reading text content from the data retrieval event to vocalize the unfocused user interface item to the user, wherein the unfocused user interface item is vocalized automatically while not under the input control focus.

2. The method of claim 1, wherein the data retrieval event is created using an extensible application markup language.

3. The method of claim 1, further comprising:
   presenting a virtual navigation option to the user.

4. The method of claim 1, further comprising:
   narrating an input control focus change.

5. The method of claim 1, further comprising:
   narrating a keyboard focus change.

6. The method of claim 1, further comprising:
   alerting the user to an error notification.

7. The method of claim 1, further comprising:
   alerting the user of a loss of service to receive a credential reauthorization.

8. The method of claim 1, further comprising:
   describing a dialogue box to the user.

9. A machine-readable storage device having a set of instructions detailing a method stored thereon that when executed by one or more processors cause the one or more processors to perform the method, the method comprising:
   vocalizing, by a narration control of an operating system, a user interface item selected as an input control focus by a user, the input control focus corresponding to a displayed element of a graphical user interface prepared to receive one or more user selections, wherein the user interface item corresponds to an application operating in a foreground, and wherein the narration control converts text from an application module to an audio format to be played for the user;
   executing and updating, by the application module while the user interface item operating in the foreground is receiving user input, an application task operating in a background outside of the input control focus without user input, wherein the application task differs from a foreground task associated with the input control focus corresponding to the application operating in the foreground;
   repurposing with the application module a data retrieval event for an application binary interface of the operating system that alerts the operating system that content associated with the application task operating in the background is available for narration, wherein the data retrieval event is repurposed to narration of an unfocused user interface item, the unfocused user interface item corresponding to a second user interface item without the input control focus; and
   producing text content for the data retrieval event to vocalize the unfocused user interface item to the user, wherein the unfocused user interface item is vocalized automatically while not under the input control focus.

10. The machine-readable storage device of claim 9, wherein the method further comprises:
    detecting the task event for the application task.

11. The machine-readable storage device of claim 9, wherein the method further comprises:
    determining a virtual navigation option for the user.

12. The machine-readable storage device of claim 9, wherein the method further comprises:
    detecting an error event.

13. The machine-readable storage device of claim 9, wherein the method further comprises: detecting a loss of service.

14. The machine-readable storage device of claim 9, wherein the method further comprises:
    producing a dialogue box for the user.

15. The machine-readable storage device of claim 14, wherein the method further comprises: cataloguing a box content of the dialogue box.

16. The machine-readable storage device of claim 9, wherein the method further comprises:
    using extensible application markup language to create the data retrieval event.

17. A user interface narrator, comprising:
    a memory configured to store a user interface having a user interface item;
    a processor configured to execute:
       an operating system having a narration control to vocalize the user interface item selected as an input control focus by a user, the input control focus corresponding to a displayed element of a graphical user interface prepared to receive one or more user selections, wherein the user interface item corresponds to an application operating in a foreground, and wherein the narration control converts text from an application module to an audio format to be played for the user; and
       an application module, operating in a background outside of the input control focus, to execute and update an application task while the user interface item operating in the foreground is receiving user input without user input, wherein the application task differs from a foreground task associated with the input control focus corresponding to the application operating in the foreground, and to repurpose a data retrieval event for an application binary interface of the operating system to alert the operating system that content associated with the application task operating in the background is available for narration, wherein the data retrieval event is repurposed to cause narration of an unfocused user interface item, the unfocused user interface item corresponding to a second user interface item without the input control focus; and an audio output configured to vocalize the unfocused user interface item from the data retrieval event, wherein the unfocused user interface item is vocalized automatically while not under the input control focus.

18. The user interface narrator of claim 17, wherein the narration control reads text content from the repurposed data retrieval event.

19. The user interface narrator of claim 17, wherein the narration control presents a virtual navigation option to the user.

20. The user interface narrator of claim 17, wherein the narration control describes a dialogue box to the user.

* * * * *